United States Patent
Ashikaga

(10) Patent No.: US 7,839,659 B2
(45) Date of Patent: Nov. 23, 2010

(54) ALTERNATING CURRENT POWER SUPPLY DEVICE AND INTEGRATED CIRCUIT FOR ALTERNATING CURRENT POWER SUPPLY DEVICE

(75) Inventor: Toru Ashikaga, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 87 days.

(21) Appl. No.: 12/295,363

(22) PCT Filed: Nov. 16, 2007

(86) PCT No.: PCT/JP2007/072281

§ 371 (c)(1),
(2), (4) Date: Sep. 30, 2008

(87) PCT Pub. No.: WO2008/078473

PCT Pub. Date: Jul. 3, 2008

(65) Prior Publication Data

US 2009/0122581 A1  May 14, 2009

(30) Foreign Application Priority Data

Dec. 22, 2006  (JP) ............................. 2006-345704
Jun. 6, 2007  (JP) ............................. 2007-150334

(51) Int. Cl.
*H02M 3/335* (2006.01)

(52) U.S. Cl. ...................................... 363/16

(58) Field of Classification Search ............ 363/16, 363/21.03, 21.02, 131
See application file for complete search history.

(56) References Cited

U.S. PATENT DOCUMENTS 5,504,667 A * 4/1996 Tanaka et al. ............... 363/37

FOREIGN PATENT DOCUMENTS

| JP | 6 68979 | 3/1994 |
|---|---|---|
| JP | 10 52059 | 2/1998 |
| JP | 10 321392 | 12/1998 |
| JP | 2000 166245 | 6/2000 |
| JP | 2002 43083 | 2/2002 |
| JP | 2005 101016 | 4/2005 |

OTHER PUBLICATIONS

U.S. Appl. No. 12/664,698, filed Dec. 15, 2009, Ashikaga.

* cited by examiner

*Primary Examiner*—Shawn Riley
(74) *Attorney, Agent, or Firm*—Oblon, Spivak, McClelland, Maier & Neustadt, L.L.P.

(57) ABSTRACT

An alternating current power supply device is provided with switch elements Q1, Q2 for converting direct current power from a direct current power supply Vin into alternating current power; a transformer T1 for converting the voltage of the alternating current power converted by the switch elements into other voltage; a load 20 connected to an output terminal of the transformer; a first detecting circuit 30 for detecting a first electric signal indicating power to be supplied to the load; a second detecting circuit 40 for detecting a second electric signal indicating the voltage of the direct current power supply; a feedback circuit 50 for generating a feedback signal based on the first electric signal detected by the first detecting circuit and the second electric signal detected by the second detecting circuit; and a control circuit 10 for generating a control signal based on the feedback signal from the feedback circuit and controlling on/off of the switch elements by the control signal so that power to be supplied to the load is at a prescribed value.

8 Claims, 16 Drawing Sheets

(a) BEFORE CORRECTION (b) AFTER CORRECTION (a)

(b)

(c)

(a)

(b)

(a)

| AC INPUT VOLTAGE [Vrms] | DUTY[%] | | OUTPUT CURRENT iout [mA] | |
|---|---|---|---|---|
| | BEFORE CORRECTION | AFTER CORRECTION | BEFORE CORRECTION | AFTER CORRECTION |
| 150 | 31.0 | 31.7 | 5.0 | 5.0 |
| 220 | 23.0 | 22.5 | 5.5 | 5.0 |
| 265 | 20.2 | 19.5 | 5.7 | 5.0 |

(b)

ALTERNATING CURRENT POWER SUPPLY DEVICE AND INTEGRATED CIRCUIT FOR ALTERNATING CURRENT POWER SUPPLY DEVICE

TECHNICAL FIELD

The present invention relates to an alternating current power supply device and an integrated circuit for the alternating current power supply device. In particular, the present invention relates to an electrical discharge lamp lighting device for supplying alternating current power to the discharge lamp as a load.

BACKGROUND OF ART

In general, an inverter as the alternating current power supply device generates a voltage of several hundreds to one thousand and hundreds of volts at a frequency of several dozens Hz and applies the voltage on a discharge lamp, for example, CCFL (Cold Cathode Fluorescent Lamp) to light on. The discharge lamp and the inverter are therefore used in combination.

The inverter comprises a direct current power supply, a bridge circuit consisting of switch elements by which a direct current electric power of the direct current power supply is converted into an alternating current power, a pressure transformer that pressurizes a voltage of the alternating current power converted in the bridge circuit to light on the discharge lamp, a current detecting circuit for detecting a current flowing through the discharge lamp, a control circuit that turns on/off the switch elements so that the current may reach a prescribed value based on the current detected by the current detecting circuit and its feedback loop.

Note here that there are two cases: one is that the pressure transformer is provided, between a primary winding and a secondary winding, with an insulation function; and another is that the pressure transformer is provided, therebetween, with no insulation function. The former case is called to as "insulation type system", while the latter is called to as "no-insulation type system".

In the non-insulation type system, the whole system is operated as the secondary side. In general, the inverter utilizes, as an input power supply thereof, a voltage of a DC/DC converter in the preceding stage of the inverter. This voltage is a secondary side voltage because it has already been insulated by the DC/DC converter. Moreover, since the voltage that has already been controlled by the DC/DC converter is input, the input voltage has a substantially constant value when viewing from the inverter, and it is not necessary to consider a wide range of variable input. In addition, as the pressure transformer is not required to have the insulation function, there is little restriction on the safety standard, allowing the non-insulation type system to be realized small and at a low price.

However, as the DC/DC converter is indispensable, the above non-insulation type system has two steps of electric power conversion stages (i.e. the DC/DC converter and the inverter). Thus, this non-insulation type system is disadvantageous in view of its efficiency and also in the price of the DC/DC converter.

On the contrary, the insulation type system can use voltage obtained by rectifying the alternating voltage as it is, as the power supply to be inputted to the inverter. Thus, owing to one step of electric power conversion stage, the insulation type system is advantageous in view of its efficiency and also advantageous in the price since the DC/DC converter can be deleted. However, as the input voltage of the inverter is nothing but the rectified alternating voltage, the variable range of voltage is large. It is therefore difficult to control the output current flowing through the discharge lamp to a constant value.

Moreover, in particular, the impedance of a discharge lamp a cold cathode fluorescent lamp has a negative resistance characteristic in general. In addition, as the brightness characteristic of a cold cathode fluorescent lamp is greatly ruled by the current flowing through the cold cathode fluorescent lamp, it is general to control the current value flowing through the cold cathode fluorescent lamp. For instance, the current value of a cold cathode fluorescent lamp is controlled since the electric power to be supplied to a transformer is changed by controlling the frequency of a switch element in a bridged circuit or controlling the duty ratio (simply referred to as "duty" after) of ON/OFF at the switch element.

However, in recent liquid crystal TVs etc., it is often the case that an interference of a driving frequency of the inverter with the clock frequency of a controller in a TV device causes a problem. It is therefore required to perform the control operation having a fixed frequency causing no problem. In this case, PWM control is used as a method of controlling the switch element of the bridged circuit. In the PWM control, the output electric power is controlled by turning ON/OFF one switch element for high side and another switch element for low side alternately, the switch elements being connected in series and also connected to both ends of the direct current power supply, while changing their ON-widths (i.e. changing their ON-duty). The greater the ON-widths do get, the larger the output power gets.

On the other hand, there is a case that the value of the direct current voltage identical to the input voltage of the inverter does change. In the notebook computer etc., for instance, there is a great change of 8V to 20V in the input voltage since the computer may be driven by batteries or may be driven through an adapter. Moreover, in case of a system directly using voltage obtained by rectifying the alternating current voltage, such as liquid crystal TV and liquid crystal monitor, there is a possibility of great change in voltage. In case of a device for a wide range of alternating current voltages, it would be subjected to a greater change in voltage.

Thus, in spite of variance in input voltage, the PWM control for the bridge circuit allows the current in the discharge lamp to be ideally controlled to a constant value since the duty is increased when the input voltage is small and alternatively, the duty is reduced when the input voltage is large. However, the change might take place in the current of the discharge lamp due to a change in input voltage. As the cause, there may be expected the following points. First, the gain of a feedback loop is small. Secondarily, the current waveform of the discharge lamp to be detected changes to cause a variation of the detected value changes consequently. In this way, the brightness of the discharge lamp is changed due to the change in the current in the discharge lamp.

Japanese Patent Publication Laid-open No. 6-68979 discloses a discharge lamp lighting device which is adapted so as to maintain the lighting of a discharge lamp at usually-stable brightness even if the voltage supplied to a lighting circuit changes by the change of the input voltage etc. This discharge lamp lighting device is adapted so as to detect a current value flowing in a switching circuit. The discharge lamp lighting device further includes a comparator that compares the detected current value with a current value defining the dimming value of the discharge lamp and outputs voltage corresponding to a current difference between the former current value and the latter current value, an oscillating circuit that changes its oscillation frequency corresponding to the voltage from the comparator and a control circuit for turning ON/OFF the switch element corresponding to the oscillation frequency from the oscillating circuit. With the above constitution, the disclosed discharge lamp lighting device is adapted so as to supply an electric load with prescribed current. In this device, it is necessary to enlarge the gain of the above-constructed feedback loop (which is equivalent to the gain of the comparator) to prevent the current flowing through the electric load from being varied due to the change of the power supply voltage.

DISCLOSURE OF THE INVENTION

In the technology disclosed in the above patent document, however, if increasing the loop gain, it becomes difficult to ensure the phase margin or the gain margin, so that it is often the case that the control becomes unstable for the change in load and the change in the voltage of a power supply. In particular, in case of burst dimming, the control becomes unstable remarkably.

Therefore, an object of the present invention is to provide an alternating current power supply device capable of preventing a variance of output current flowing through a load with the deletion of unstable control due to a loop gain established excessively, and an integrated circuit for such an alternating current power supply device.

In order to solve the above-mentioned problem, the principle feature of the present invention resides in the provision of an alternating current power supply device comprising: a direct current power supply; a switch element for converting direct current power from the direct current power supply into alternating current power, a transformer for converting voltage of the alternating current power converted by the switch element into other voltage; a load connected to an output terminal of the transformer, a first detecting circuit for detecting a first electric signal indicating power to be supplied to the load; a second detecting circuit for detecting a second electric signal indicating the voltage of the direct current power supply; a feedback circuit for generating a feedback signal based on the first electric signal detected by the first detecting circuit and the second electric signal detected by the second detecting circuit; and a control circuit for generating a control signal based on the feedback signal from the feedback circuit and controlling on/off of the switch element by the control signal so that power to be supplied to the load is at a prescribed value. Here, it is defined that the above power to be supplied to the load represents terminal voltage of the load after turning ON, current flowing through the load or a product of these elements.

The principle feature of the present invention also resides in the provision of an integrated circuit for an alternating current power supply device, wherein the control circuit of the above alternating current power supply device and at least one of the feedback circuit and the second detecting circuit are arranged on an identical semiconductor substrate.

BEST MODE FOR CARRYING OUT THE INVENTION

Embodiments of the alternating current power supply device of the present invention will be described with reference to drawings below, in detail.

Constitution of Basic Principle of the Present Invention

Figure 1:
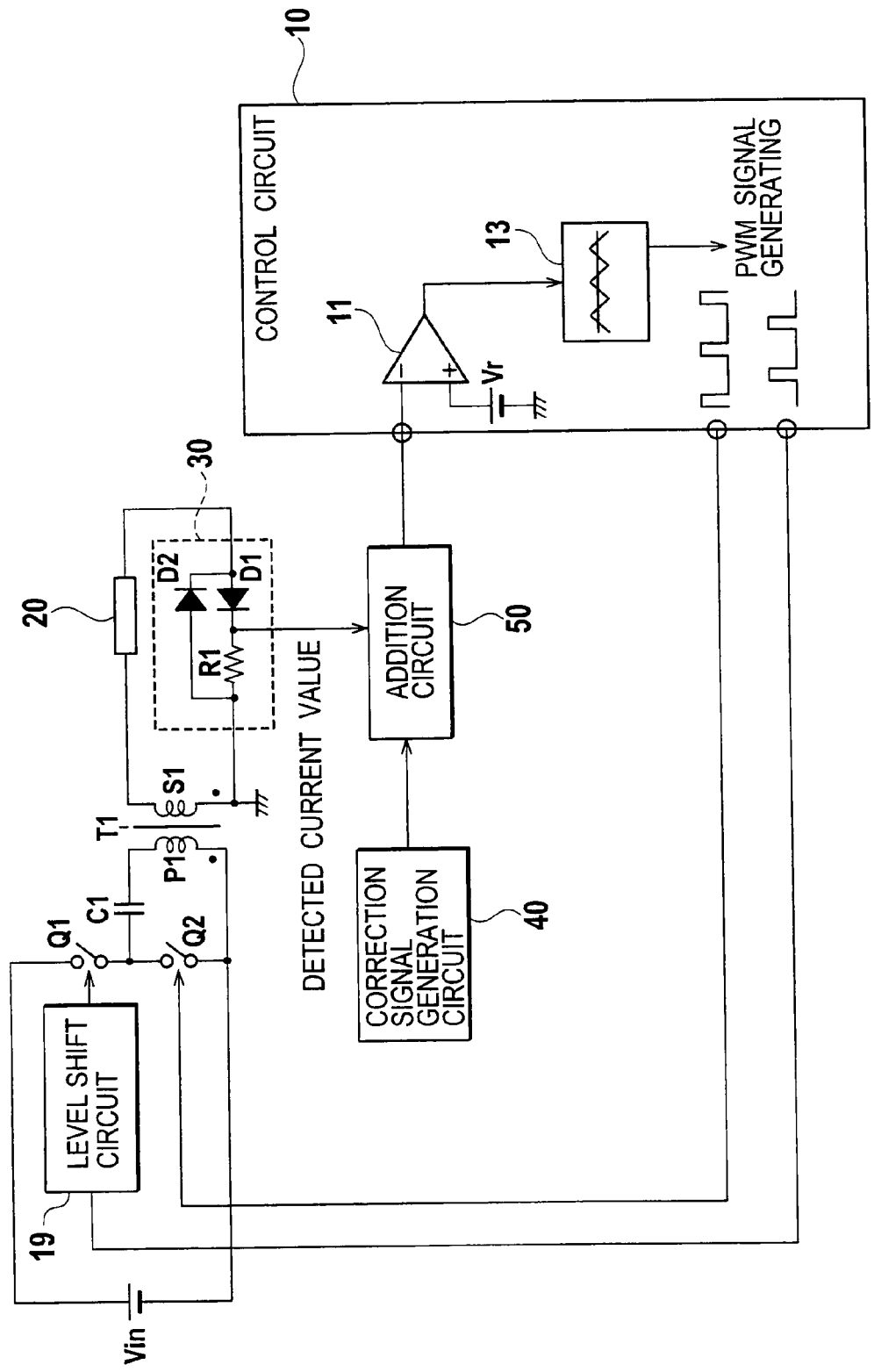
FIG. 1 is a basic principle circuit diagram of the alternating current power supply device of the present invention.

FIG. 1 is a basic principle circuit diagram of the alternating current power supply device of the present invention. Here, a load is identical to a discharge lamp comprising a CCFL (Cold Cathode Fluorescent Lamp) and therefore, the alternating current power supply device will be described as a discharge lamp lighting device for the discharge lamp.

In the discharge lamp lighting device shown in FIG. 1, a series circuit having a switch element Q1 consisting of N-type MOSFET and a switch element Q2 consisting of N-type MOSFET is connected with both ends of a direct current power supply Vin. The switch element Q1 and the switch element Q2 convert a direct current power of the direct current power supply Vin into an alternating current power. The switch element Q1 is turned ON/OFF through a level shift circuit 19 by a control signal sent from a control circuit 10. The switch element Q2 is turned ON/OFF by a control signal sent from the control circuit 10.

Between a source of the switch element Q2 and its drain, there is connected a direct circuit where a primary winding P1 of a transformer T1, a reactor Lr1 (not shown) consisting of leakage inductance and a capacitor C1 for current resonance are connected in series.

Note, in FIG. 1, the reactor Lr1 consists of the leakage inductance between the primary winding P1 and a secondary winding S1 of the transformer T1, which controls the resonance operation. Between both ends of a secondary winding S1 of the transformer T1, a discharge lamp 20 is connected to a current detecting circuit 30 for detecting the current flowing through the discharge lamp 20, in series. The transformer T1 pressurizes the converted alternating voltage and lights up the discharge lamp 20.

The current detecting circuit 30 corresponds to the first detecting circuit of the present invention and comprises a series circuit having a diode D1 connected to the discharge lamp 20 in series and a resistance R1, and a diode D2 connected with the series circuit in parallel. The current detecting circuit 30 detects current flowing through the discharge lamp 20 and outputs the detected current to an addition circuit 50. Corresponding to the second detecting circuit of the present invention, a correction signal generation circuit 40 generates a correction signal to control output current flowing through the discharge lamp 20 to a constant value in spite of voltage variation of the direct current power supply Vin, and output the correction signal to the addition circuit 50.

Corresponding to the feedback circuit of the present invention, the addition circuit 50 adds the voltage based on the correction signal from the correction signal generation circuit 40 to the voltage based on the current value detected by the current detecting circuit 30, and outputs the added voltage to an inversion terminal of an error amplifier 11 of the control circuit 10. The control circuit 10 includes the error amplifier 11 and a comparator circuit 13, and turns ON/OFF the switch elements Q1, Q2 so that the current flowing through the discharge lamp 20 becomes a prescribed value based on the voltage from the addition circuit 50.

The error amplifier 11 amplifies error voltage between reference voltage Vr of a non-inversion terminal and voltage from the addition circuit 50, and outputs an error voltage signal to the comparator circuit 13. The comparator circuit 13 compares the error voltage signal (a feedback signal) from the error amplifier 11 with a triangular wave signal, and generates two PWM signals having a prescribed deadtime and the phase difference of 180°. One of the PWM signals is outputted to a level shift circuit 19, and the other signal is outputted to the switch element Q2.

Next, a method of improving the regulation characteristic in the current of the discharge lamp 20 by the correction signal generation circuit 40 will be described in detail. According to the regulation characteristic (before the correction) shown in FIG. 2(a), the duty of the gating signals of the switch element Q1, Q2 is reduced as the input voltage Vin gets increased. Thus, when the input voltage gets smaller, the duty is increased. This behavior is a correct operation.

However, since the operation of making this duty "small" or "large" is insufficient, it is impossible to maintain the current of the discharge lamp 20 at a constant value. Thus, as shown with the regulation characteristic (after the correction) of FIG. 2(b), it has only to make the duty further smaller when it is small and further larger when it is large.

For this purpose, it is here performed that the addition circuit 50 adds a positive correction value from the correction signal generation circuit 40 to a detected current value of the discharge lamp 20 detected by the current detecting circuit 30, as follows.

When recognizing the current of the discharge lamp 20 being increased, the control circuit 10 tries to reduce the duty thereby to decrease the current of discharge lamp 20. Therefore, the invention utilizes this characteristic of the control circuit 10. That is, the correction signal generation circuit 40 outputs a small correction value to the addition circuit 50 when the input voltage is small (i.e. when the duty is large). Then, the addition circuit 50 adds the small correction value from the correction signal generation circuit 40 to the detected current value of the discharge lamp 20, and outputs the added value to the inversion terminal of the error amplifier 11. Therefore, as the output of the error amplifier 11 rises, it is possible to increase the duty furthermore.

On the other hand, when the input voltage is large (i.e. when the duty is small), the correction signal generation circuit 40 outputs a great correction value to the addition circuit 50. Then, the addition circuit 50 adds the great correction value from the correction signal generation circuit 40 to the detected current value of the discharge lamp 20, and outputs the added current value to the inversion terminal of the error amplifier 11. Consequently, as the output of the error amplifier 11 decreases, it is possible to reduce the duty furthermore.

According to the alternating current power supply device of Embodiment 1, the correction signal generated by the correction signal generation circuit 40 is inputted to the control circuit 10 through the addition circuit 50. That is, by inputting the variance of input voltage of the direct current power supply Vin to the control circuit 10, it is possible to prevent the output current from being varied due to the variance of input voltage even if the loop gain of the error amplifier 11 is reduced. Consequently, unstable controls (oscillation, hunting, overshoot, etc.) caused by an increase in loop gain are eliminated to stabilize the control operation.

Embodiment 1

Figure 3:
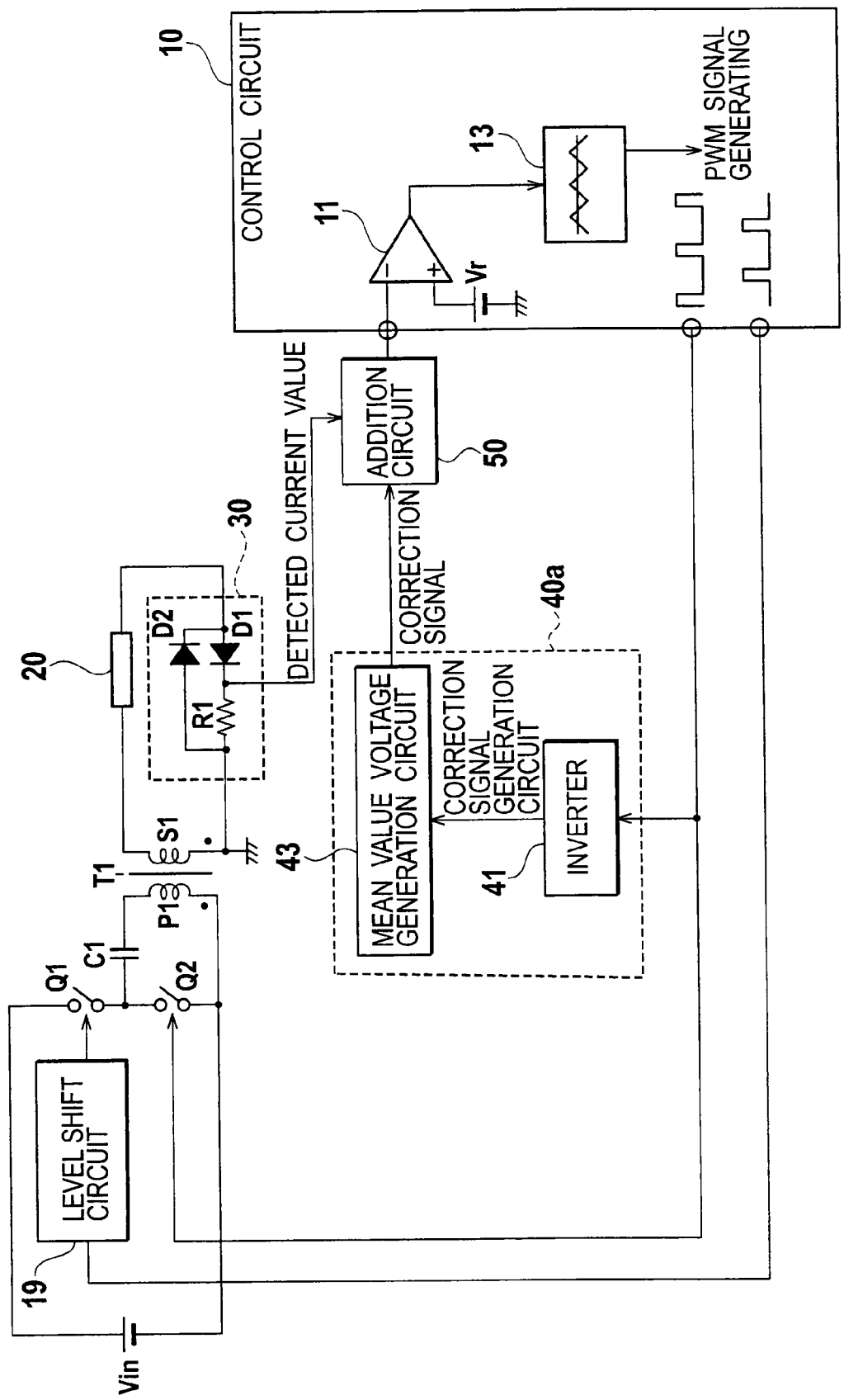
FIG. 3 is a circuit diagram of Embodiment 1 of the alternating current power supply device of the present invention.
Figure 4:
FIG. 4 is a view showing a method of correcting the regulation characteristic with a correction signal generation circuit of Embodiment 1 of the alternating current power supply device of the present invention.
Figure 4:
Figure 4:
Figure 4:
Figure 4:
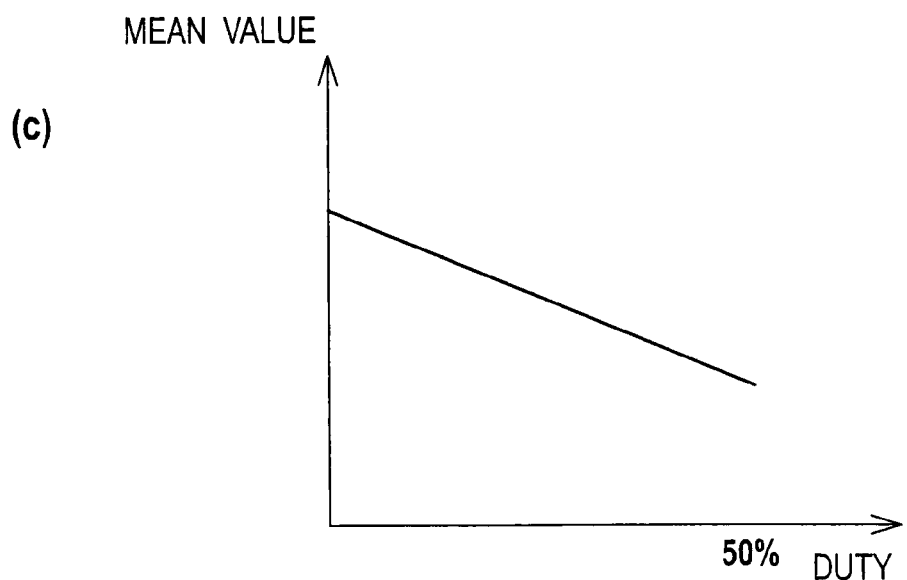

FIG. 3 is a circuit diagram of Embodiment 1 of the alternating current power supply device of the present invention. FIG. 4 is a view showing a method of correcting the regulation characteristic with a correction signal generation circuit of Embodiment 1 of the alternating current power supply device of the present invention. The alternating current power supply device of Embodiment 1 is characterized in that a correction signal generation circuit 40a comprises an inverter 41 and a mean value voltage generation circuit 43. As the other constitutions are identical to those of FIG. 1, the same elements are indicated with the same reference numerals, respectively.

The inverter 41 inputs a gate signal for the switch element Q2 and inverts the gate signal. Instead of the gate signal for the switch element Q2, it may be carried out to invert a gate signal for the switch element Q1. For instance, pulse signals having their duties inversed as shown in FIG. 4(b) can be obtained since the inverter 41 inverts the gate signal of 50% or 20% as shown in FIG. 4(a).

The mean value voltage generation circuit 43 calculates mean value voltage of the gate signal for the switch element Q2 that has been inversed by the inverter 41. For example, the mean value voltage generation circuit 43 calculates mean value voltage of the pulse signal shown in FIG. 4(b), which is obtained by inverting the gate signal having 50% or 20% in duty. Therefore, as shown in FIG. 4(c), the mean value voltage has a large value when the duty is small, and the mean value voltage have a small value when the duty is large. This mean value voltage is transmitted to the addition circuit 50, as a correction signal.

The addition circuit 50 adds the mean value voltage from the mean value voltage generation circuit 43 to a detected current value of the discharge lamp 20, and outputs the resulting value to the inversion terminal of the error amplifier 11 of the control circuit 10. That is, the same circuit 50 carries out a feedback control.

Figure 2:
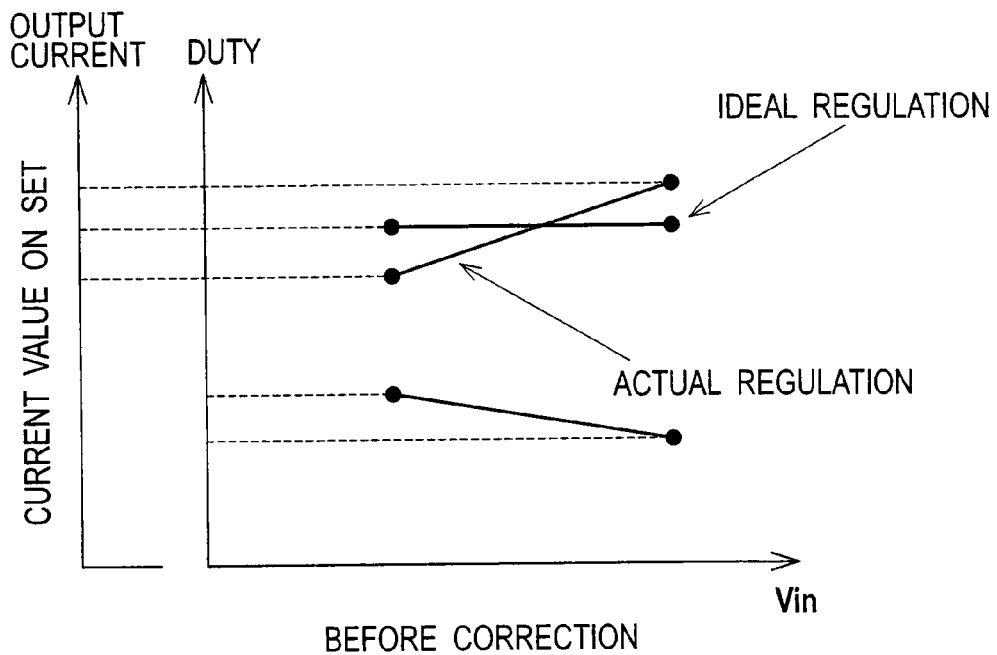
FIG. 2 is a view showing the regulation characteristic before and after the correction of the alternating current power supply device of the present invention.
Figure 2:
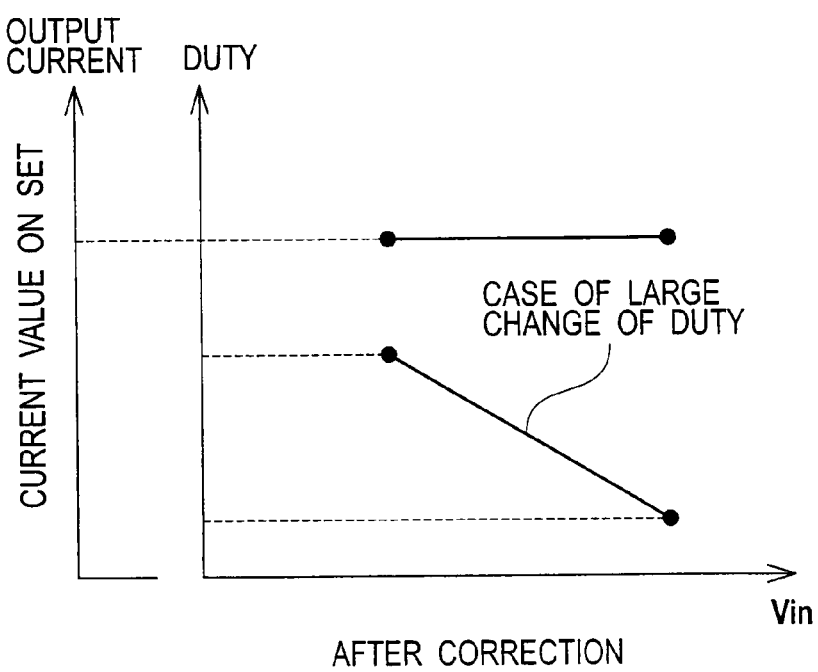

As a result, it is possible to reduce the duty furthermore when the duty is small (i.e. when the input voltage is large), and also possible to increase the duty furthermore when the duty is large (i.e. when the input voltage is small). Therefore, as shown in FIG. 2(b), even if the input voltage varies, the output current of the discharge lamp 20 becomes a constant value. That is, it is possible to improve the regulation characteristic about the current of the discharge lamp 20.

In this way, by inputting the variance of the input voltage of the direct current power supply Vin to the control circuit 10, it is possible to prevent the output current from being varied by the variance of the input voltage even if the loop gain of the error amplifier 11 is reduced. As a result, the unstable control due to an increasing of the loop gain can be eliminated to stabilize the control operation.

Variation of Embodiment 1

Figure 5:
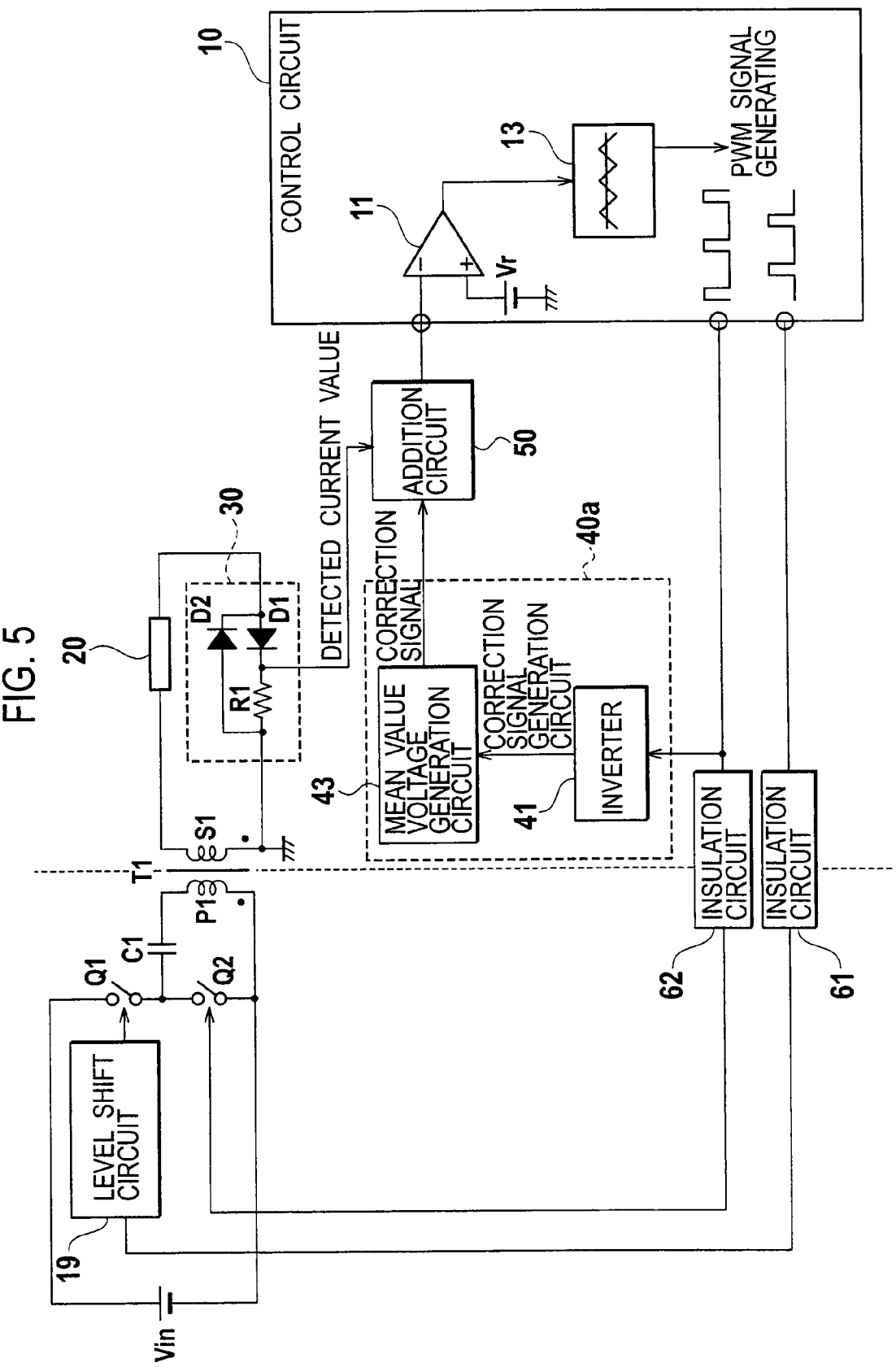
FIG. 5 is a circuit diagram of a variation of Embodiment 1 of the alternating current power supply device of the present invention.

FIG. 5 is a circuit diagram of a variation of Embodiment 1 of the alternating current power supply device of the present invention. The alternating current power supply device of the variation of Embodiment 1 shown in FIG. 5 is characterized in the provision of an insulation circuit 61 between the control circuit 10 and the level shift circuit 19 and an insulation circuit 62 between the control circuit 10 and the switch element Q2, for the alternating current power supply device of Embodiment 1 shown in FIG. 3.

As a result, in addition to the effect of the alternating current power supply device of Embodiment 1, it is possible to establish insulation between the input side of the transformer T1 and the control circuits 10 on the secondary side of the transformer T1.

Embodiment 2

Figure 6:
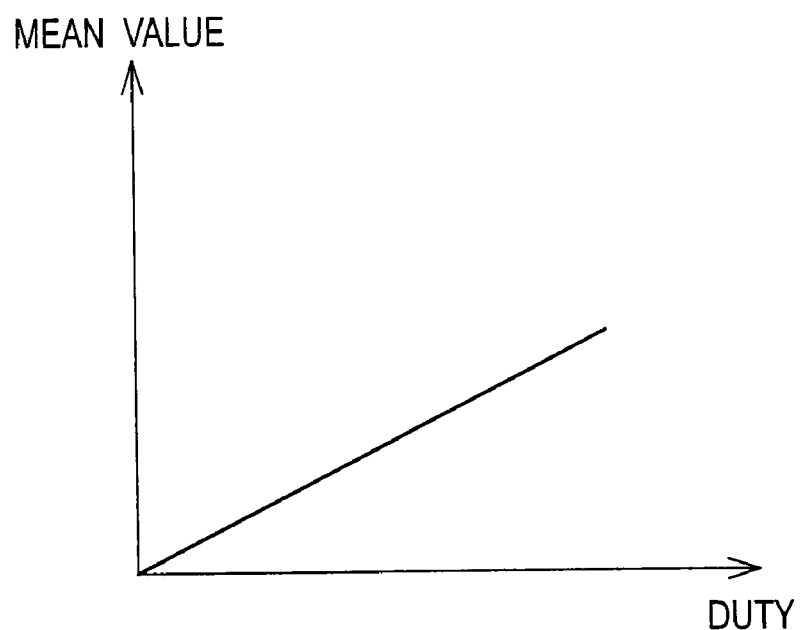
FIG. 6 includes views showing a mean value of duties of the alternating current power supply device of Embodiment 2 and the inverting characteristic of the duties.
Figure 6:
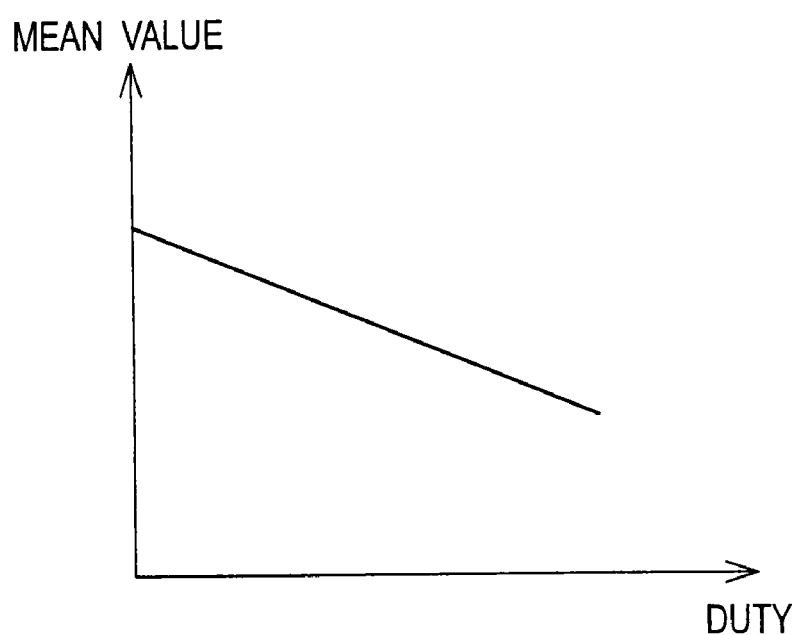
Figure 7:
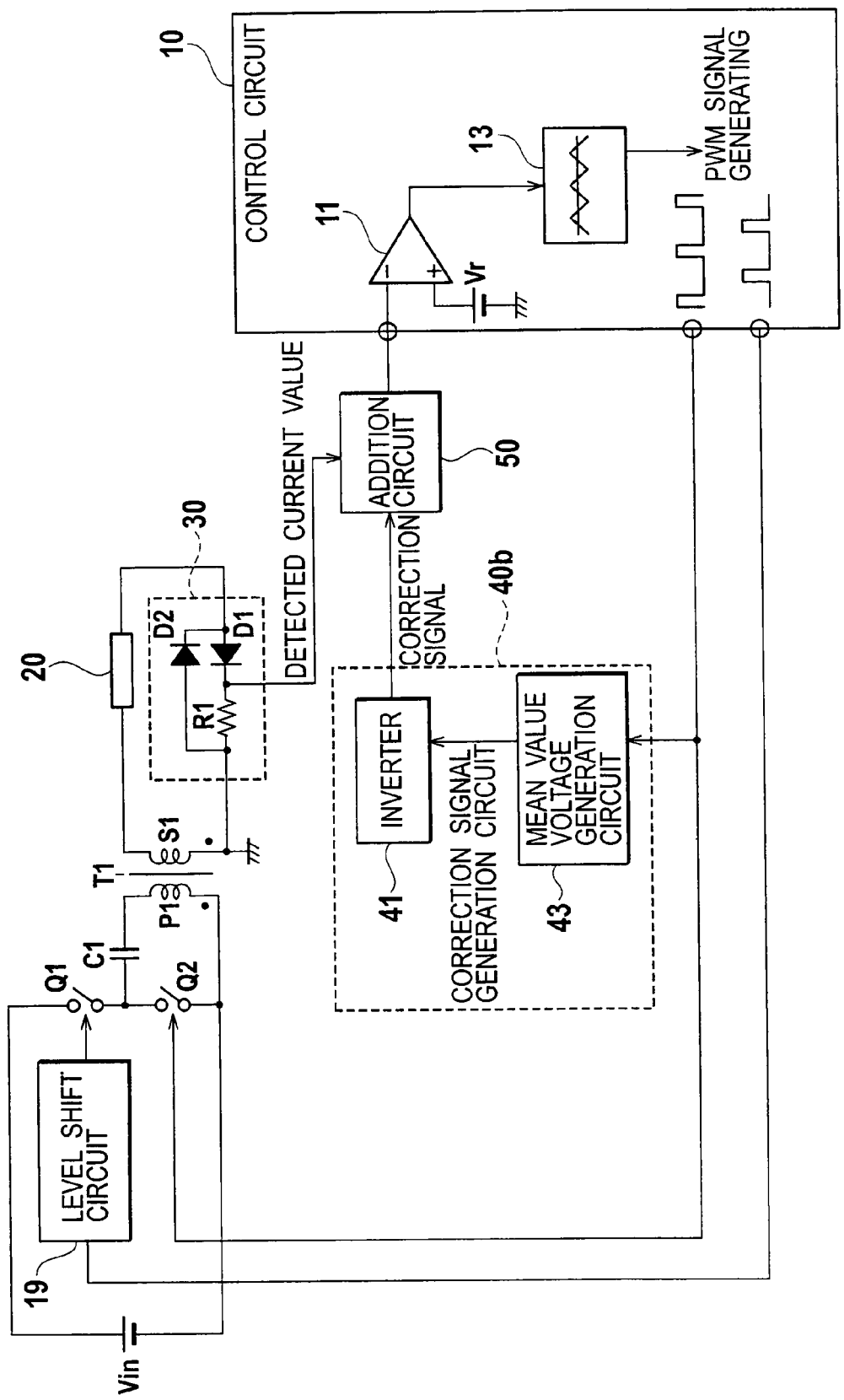
FIG. 7 is a circuit diagram of Embodiment 2 of the alternating current power supply device of the present invention.

FIG. 6 includes views showing a mean value of duties of the alternating current power supply device of Embodiment 2 and the inverting characteristic of the duties. FIG. 7 is a circuit diagram of Embodiment 2 of the alternating current power supply device of the present invention. The alternating current power supply device of Embodiment 2 is characterized in that a correction signal generation circuit 40b comprises the mean value voltage generation circuit 43 and the inverter 41. As the other constitutions are identical to those of FIG. 1, the same elements are indicated with the same reference numerals, respectively.

The mean value voltage generation circuit 43 calculates mean value voltage of the gate signal for the switch element Q2. This mean value voltage gets larger in proportion to the magnitude of duty, as shown in FIG. 6(a). The inverter 41 sends mean value voltage, which has been obtained by inverting the mean value voltage from the mean value voltage generation circuit 43, to the addition circuit 50, as a correction signal. As shown in FIG. 6(b), the inverted mean value voltage is large when the duty is small, and the inverted mean value voltage is small when the duty is large.

The addition circuit 50 adds the mean value voltage from the inverter 41 to the detected current value of the discharge lamp 20, and outputs the resulting voltage to the inversion terminal of the error amplifier 11 of the control circuit 10. That is, the circuit 50 carries out a feedback control. Therefore, the effects similar to the alternating current power supply device of Embodiment 1 are achieved.

Variation of Embodiment 2

Figure 8:
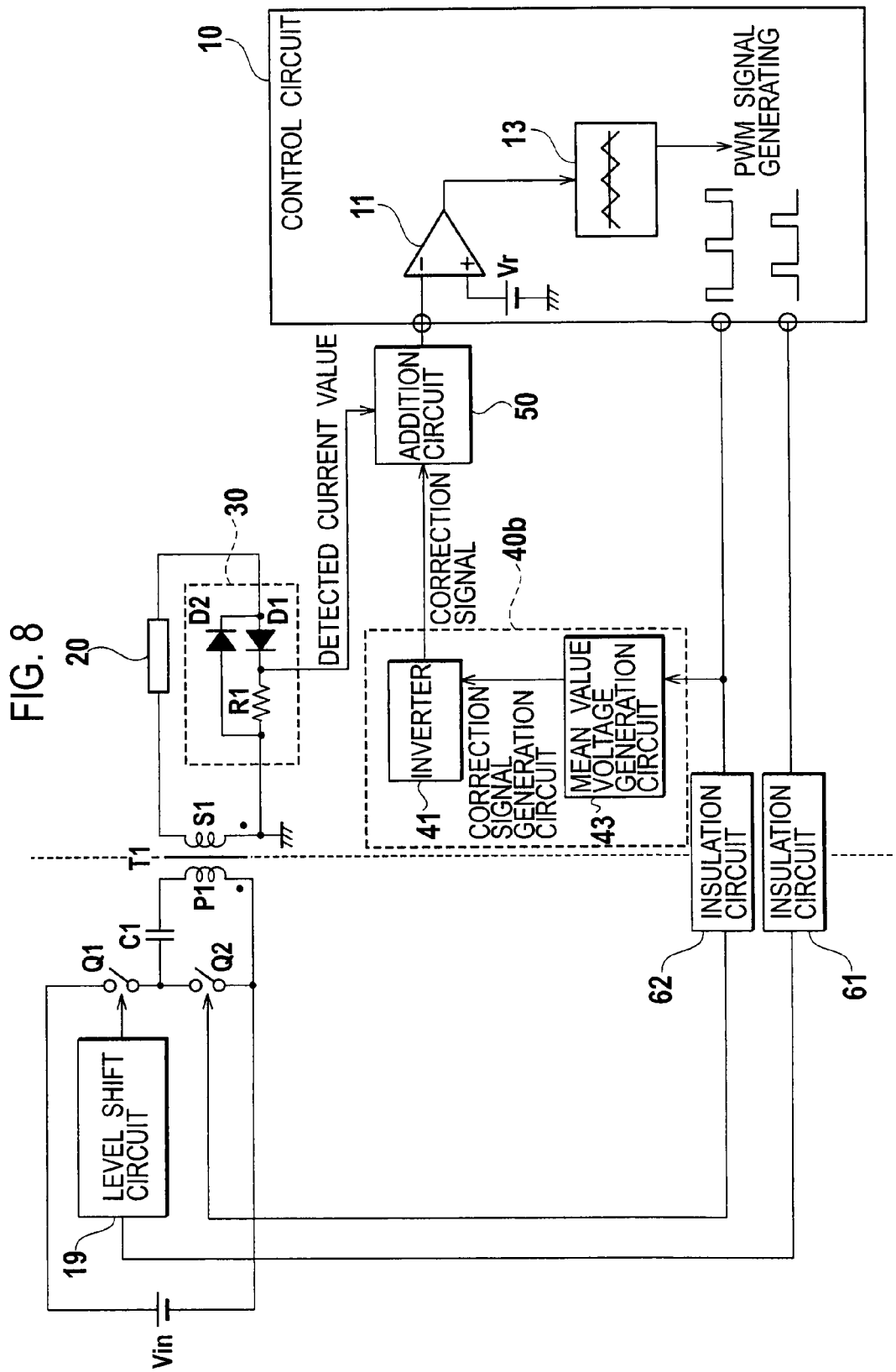
FIG. 8 is a circuit diagram of a variation of Embodiment 2 of the alternating current power supply device of the present invention.

FIG. 8 is a circuit diagram of a variation of Embodiment 2 of the alternating current power supply device of the present invention. The alternating current power supply device of Embodiment 2 shown in FIG. 8 is characterized in the provision of the insulation circuit 61 between the control circuit 10 and the level shift circuit 19 and the insulation circuit 62 between the control circuit 10 and the switch element Q2, for the alternating current power supply device of Embodiment 2 shown in FIG. 7.

As a result, in addition to the effect of the alternating current power supply device of Embodiment 2, it is possible to establish insulation between the input side of the transformer T1 and the control circuits 10 on the secondary side of the transformer T1.

Detailed Example of Variation of Embodiment 2

Figure 9:
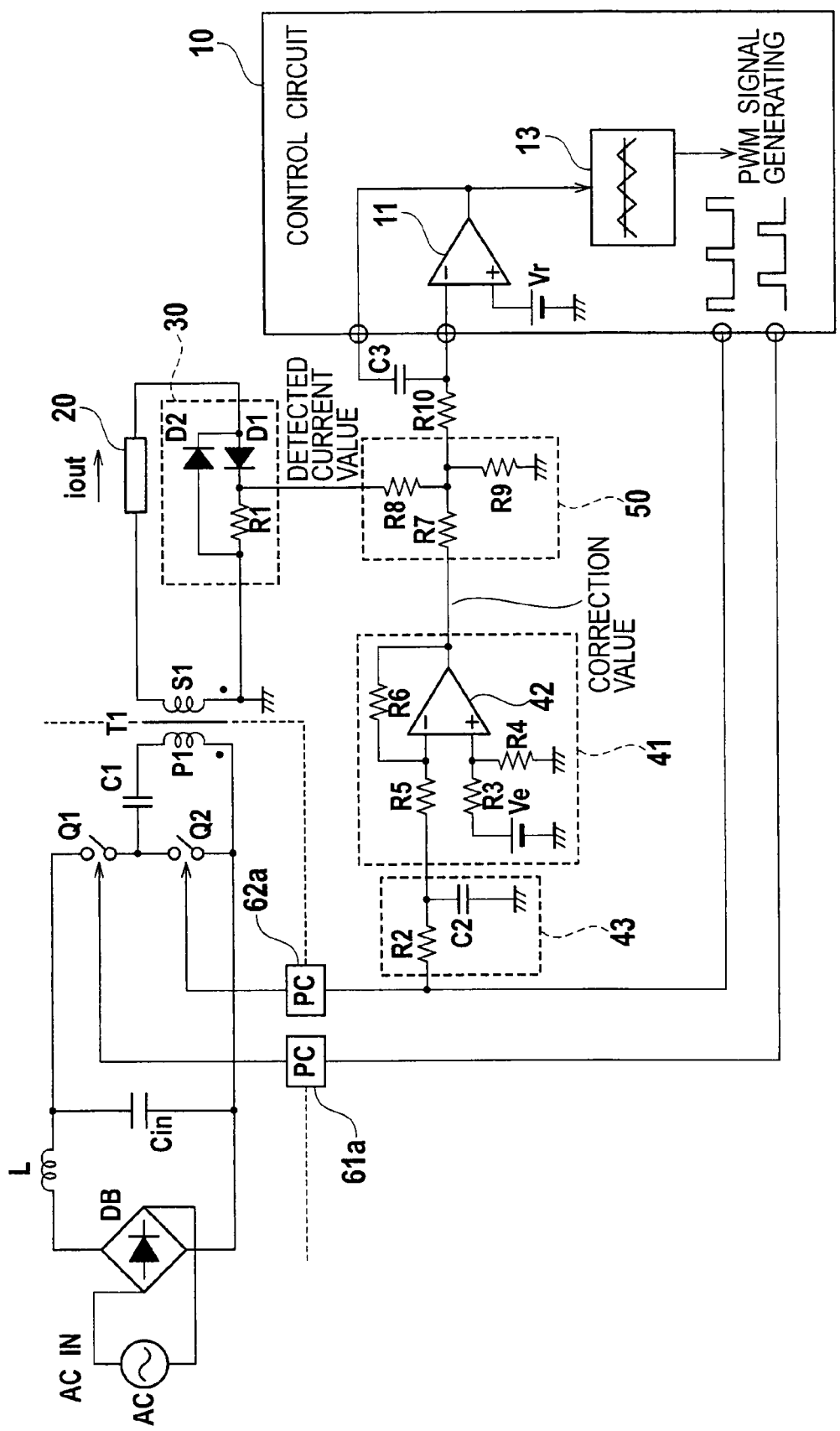
FIG. 9 is a detailed circuit diagram of the variation of Embodiment 2 of the alternating current power supply device of the present invention.

FIG. 9 is a detailed circuit diagram of the variation of Embodiment 2 of the alternating current power supply device of the present invention. In FIG. 9, a photo coupler PC61a as the insulation circuit is installed between the control circuit 10 and the switch element Q1, and a photo coupler PC62a as the insulation circuit is installed between the control circuit 10 and the switch element Q2.

The mean value voltage generation circuit 43 includes an integration circuit composed of a resistance R2 and a capacitor C2 both of which apply an average processing to the gate signal for the switch element Q2, and outputs the mean value voltage.

In the inverter 41, a resistance R4 is connected between a non-inversion terminal of an inverting part 42 and ground. Further, a series circuit composed of a resistance R3 and a reference voltage Ve is connected between the non-inversion terminal of the inverting part 42 and the ground. An inversion terminal of the inverting part 42 is connected with a connection point between the resistance R2 and the capacitor C2 through a resistance R5. A resistance R6 is connected between the inversion terminal of the inverting part 42 and its output terminal. In the inverter 41, partial voltage obtained by dividing the reference voltage Ve by the resistance R3 and the resistance R4 is applied to the non-inversion terminal of the inverting part 42, and the mean value voltage from the mean value voltage generation circuit 43 is applied to the inversion terminal through the resistance R5. Thus, the inverter 41 inverses the mean value voltage, and outputs it.

The addition circuit 50 comprises a resistance R9 connected to the output terminal of the inverting part 42, a resistance R8 connected to the output terminal of the current detecting circuit 30 (connection point between the resistance R1 and the diode D1) and a resistance R9 connected between a connection point between the resistances R7, R8 and the ground. The addition circuit 50 adds the mean value voltage from the inverter 41 through the resistance R7 to the voltage based on the detected current value from the current detecting circuit 30 through the resistance R8, and outputs the resulting voltage to the inversion terminal of the error amplifier 11 through the resistance R10.

Figure 10:
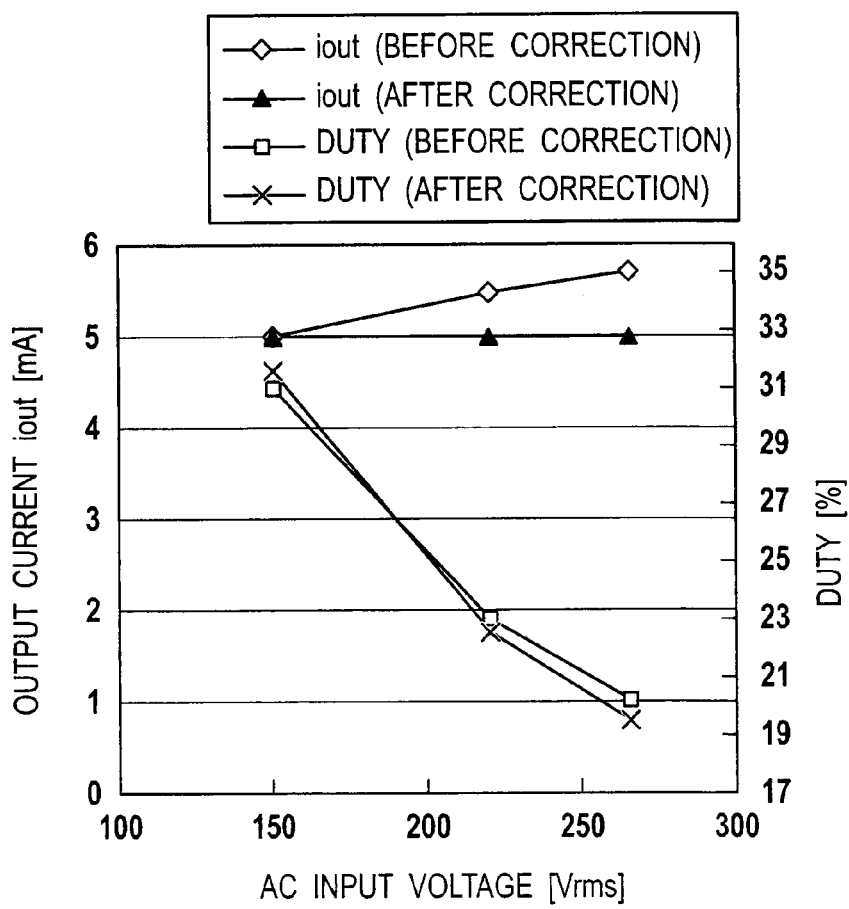
FIG. 10 includes diagrams showing an actual regulation characteristic with the correction signal generation circuit when changing an input voltage in a concrete circuit of the variation of Embodiment 2 of the alternating current power supply device of the present invention.

FIG. 10 includes diagrams showing an actual regulation characteristic with the correction signal generation circuit when changing an input voltage in a concrete circuit of the variation of Embodiment 2 of the alternating current power supply device of the present invention. FIG. 10(a) shows the input voltage [V], the duty [%] after and before the correction and the output current iout [mA] before and after the correction, in the form of a table. FIG. 10(b) shows the input voltage [V], the duty [%] after and before the correction and the output current iout [mA] before and after the correction, in the form of a graph. The input voltage changes at 150V, 220V, 265V, and alphabets "rns" indicates an effective value.

From FIG. 10, it will be understood that when the duty before the correction is small, the duty after the correction gets smaller furthermore, and when the duty before the correction is larger, the duty after the correction gets larger furthermore. Moreover, it will be understood from FIG. 10 that the output current of the discharge lamp 20 maintains a constant value even if the input voltage changes, exhibiting an ideal regulation.

Embodiment 3

In common with the alternating current power supply devices of Embodiments 1 and 2 mentioned above, there are employed, as the switch element Q1 and Q2, elements each of which is turned ON when a H level signal is inputted to an element's gate or base, for example, N type MOSFET and NPN transistor.

On the contrary, there exist reverse-logic type switch elements, for example, P type MOSFET, PNP transistor and so on. Each of these elements is turned ON when the gating signal is L level, allowing the level shift circuit to be fabricated with ease. Therefore, these elements are often used as switch elements for high side.

Figure 11:
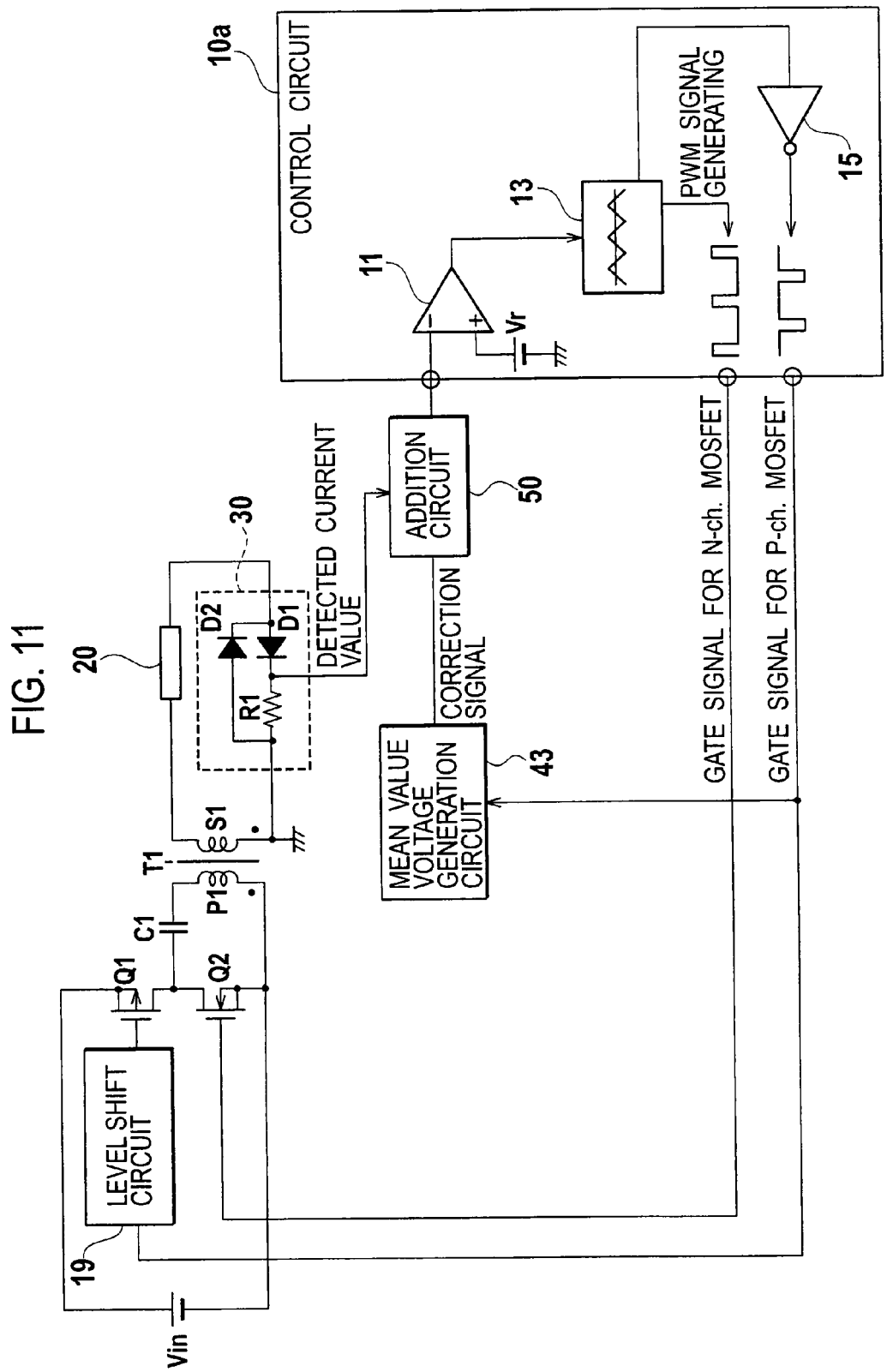
FIG. 11 is a circuit diagram of Embodiment 3 of the alternating current power supply device of the present invention.

Then, Embodiment 3 is characterized in that the switch element Q2 is formed by N type MOSFET for low side, while the switch element Q1 is formed by P type MOSFET for high side, as shown in FIG. 11.

In addition, a control circuit 10a is characterized in outputting a gate signal for N type MOSFET as the control signal to the switch element Q2 and also a gate signal for P type MOSFET, which has by the inverter 15, to the switch element Q1, and outputting the gate signal for P type MOSFET to the mean value signal generation circuit 43.

In this way, according to the alternating current power supply device of Embodiment 3, as the gate signal for P type MOSFET having the phase difference of 180° from the gate signal for N type MOSFET and further inverted in the above way is outputted to the mean value signal generation circuit 43, it becomes unnecessary to invert the gate signal. Thus, the mean value signal generation circuit 43 could output the correction signal to the addition circuit 50 if only averaging the gate signal. It is therefore possible to eliminate the inverter 41, allowing the constitution to be simplified.

Variation of Embodiment 3

In connection with the alternating current power supply device of Embodiment 3 shown in FIG. 11, there may be arranged the insulation circuit 61 between the control circuit 10 and the level shift circuit 19, and the insulation circuit 62 between the control circuit 10 and the switch element Q2.

As a result, in addition to the effect of the alternating current power supply device of Embodiment 3, it is possible to establish insulation between the input side of the transformer T1 and the control circuits 10 on the secondary side of the transformer T1.

According to the alternating current power supply devices of Embodiments 1 to 3 mentioned above, by paying attention that the change in the input voltage of the direct current power supply Vin is similar to the change in the duty of the gate signals of the switch elements Q1, Q2, it is possible to correct the output current without detecting the input voltage and with only the gate signal.

That is, the output current can be corrected on the second side (control side) only. Therefore, especially in case of the insulation type system, it is possible to carry out the correcting operation without exchanging the signals in between the primary side and the secondary side. Moreover, it is possible to reduce the ripple of the output current derived from the ripple of the input voltage.

Embodiment 4

Figure 12:
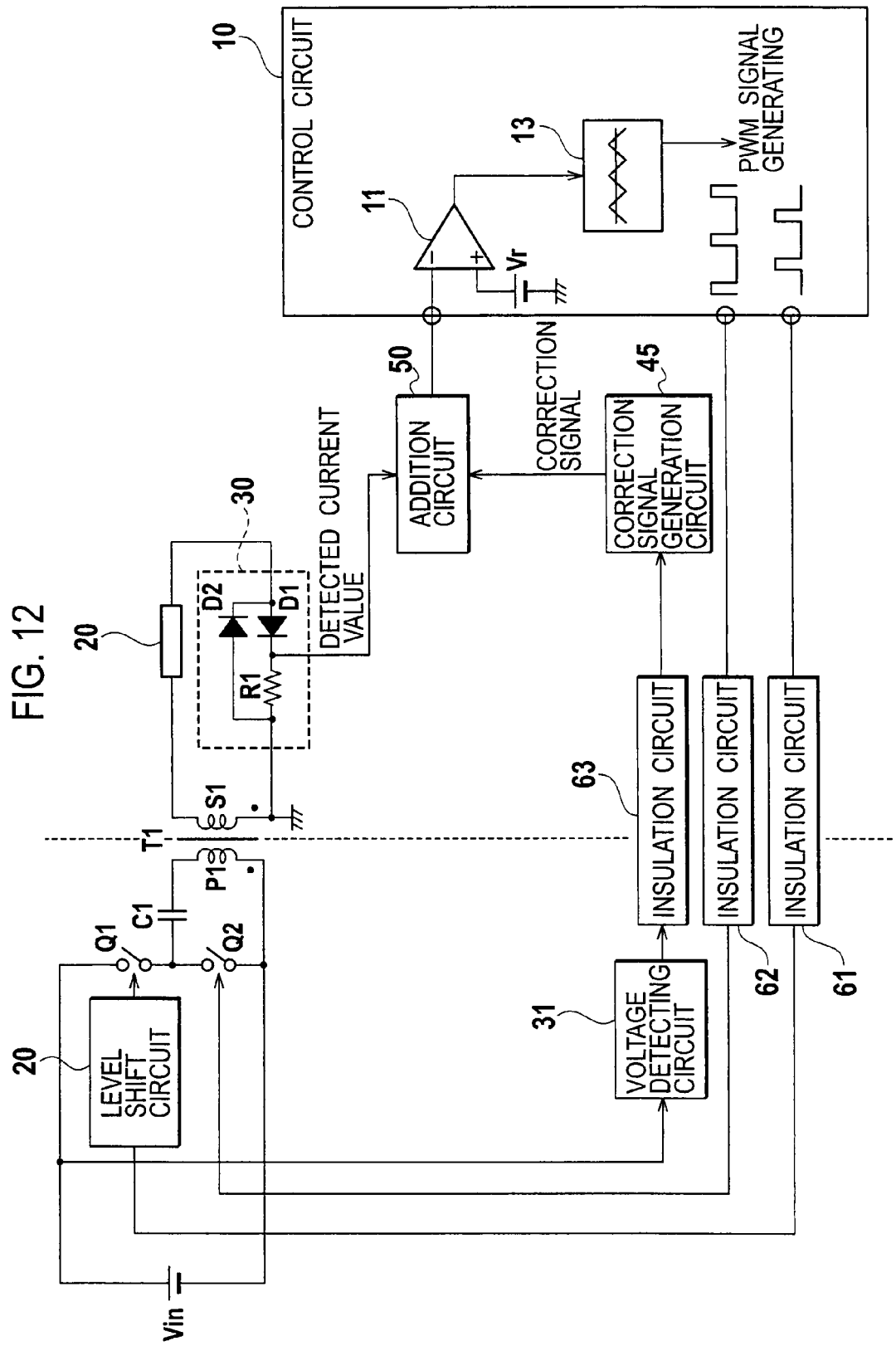
FIG. 12 is a circuit diagram of Embodiment 4 of the alternating current power supply device of the present invention.

FIG. 12 is a circuit diagram of Embodiment 4 of the alternating current power supply device of the present invention. The alternating current power supply device of Embodiment 4 is characterized in detecting the input voltage of the direct current power supply Vin on the primary side of the device, and correcting the output current by the correction signal generation circuit 45 and the control circuit 10 both on the second side of the device thereby to improve the regulation characteristic.

The alternating current power supply device shown in FIG. 12 is characterized in providing the insulation circuits 61 to 63 each consisting of a voltage detecting circuit 31 and either an insulation transformer or a photo coupler etc., and further providing a correction signal generation circuit 45 in place of the correction signal generation circuit 40, different from the alternating current power supply device of FIG. 1. As the other constitutions are identical to those of FIG. 1, the same elements are indicated with the same reference numerals, respectively.

The voltage detecting circuit 31 is arranged on the primary side of the transformer T1 to detect voltage of the direct current power supply Vin. The insulation circuit 63 insulates and outputs the voltage of the direct current power supply Vin detected by the voltage detecting circuit 31 to the correction signal generation circuit 45.

The correction signal generation circuit 45 generates a correction signal based on the voltage of the direct current power supply Vin detected by the voltage detecting circuit 31 through the insulation circuit 63. The addition circuit 50 adds the correction signal from the correction signal generation circuit 45 to the detected current value detected by the current detecting circuit 30, and outputs the resulting value to the inversion terminal of the error amplifier 11 of the control circuit 10.

In this way, according to the alternating current power supply device of Embodiment 4, by detecting the input voltage of the direct current power supply Vin on the primary side of the device, and correcting the output current by the correction signal generation circuit 45 and the control circuit 10 both on the second side of the device, it is possible to improve the regulation characteristic of the device.

Embodiment 5

Figure 13:
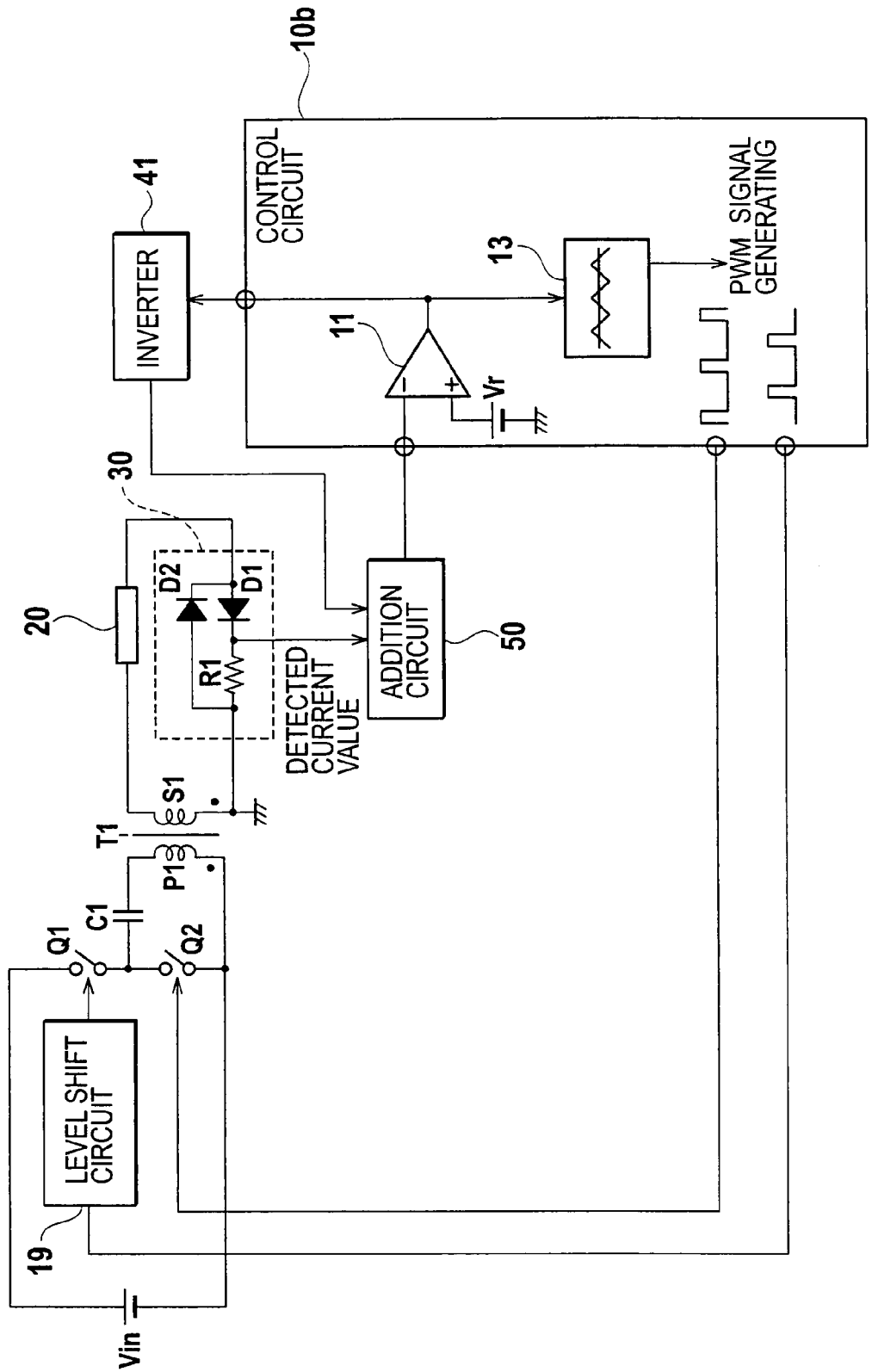
FIG. 13 is a circuit diagram of Embodiment 5 of the alternating current power supply device of the present invention.

FIG. 13 is a circuit diagram of Embodiment 5 of the alternating current power supply device of this invention. The alternating current power supply device of FIG. 13 is characterized in providing the inverter 41 (inversion signal generation circuit) in place of the correction signal generation circuit 40 of the alternating current power supply device shown in FIG. 1, which inverts the output voltage of the margin amplifier 11 in a control circuit 10b and outputs the inversion signal to the addition circuit 50. As the other constitutions are identical to those of FIG. 1, the same elements are indicated with the same reference numerals, respectively.

The inverter 41 inverts the output voltage of the margin amplifier 11 and outputs this inversion signal to the addition circuit 50. The addition circuit 50 adds the correction signal as being the inversion signal from the inverter 41 to the detected current value detected by the current detecting circuit 30, and outputs the resulting value to the inversion terminal of the error amplifier 11 of the control circuit 10b.

In this way, according to the alternating current power supply device of Embodiment 5, by correcting the output current through the use of the output voltage of the error amplifier 11 in the control circuit 10b, it is possible to improve the regulation characteristic of the device.

Detailed Example of Embodiment 5

Figure 14:
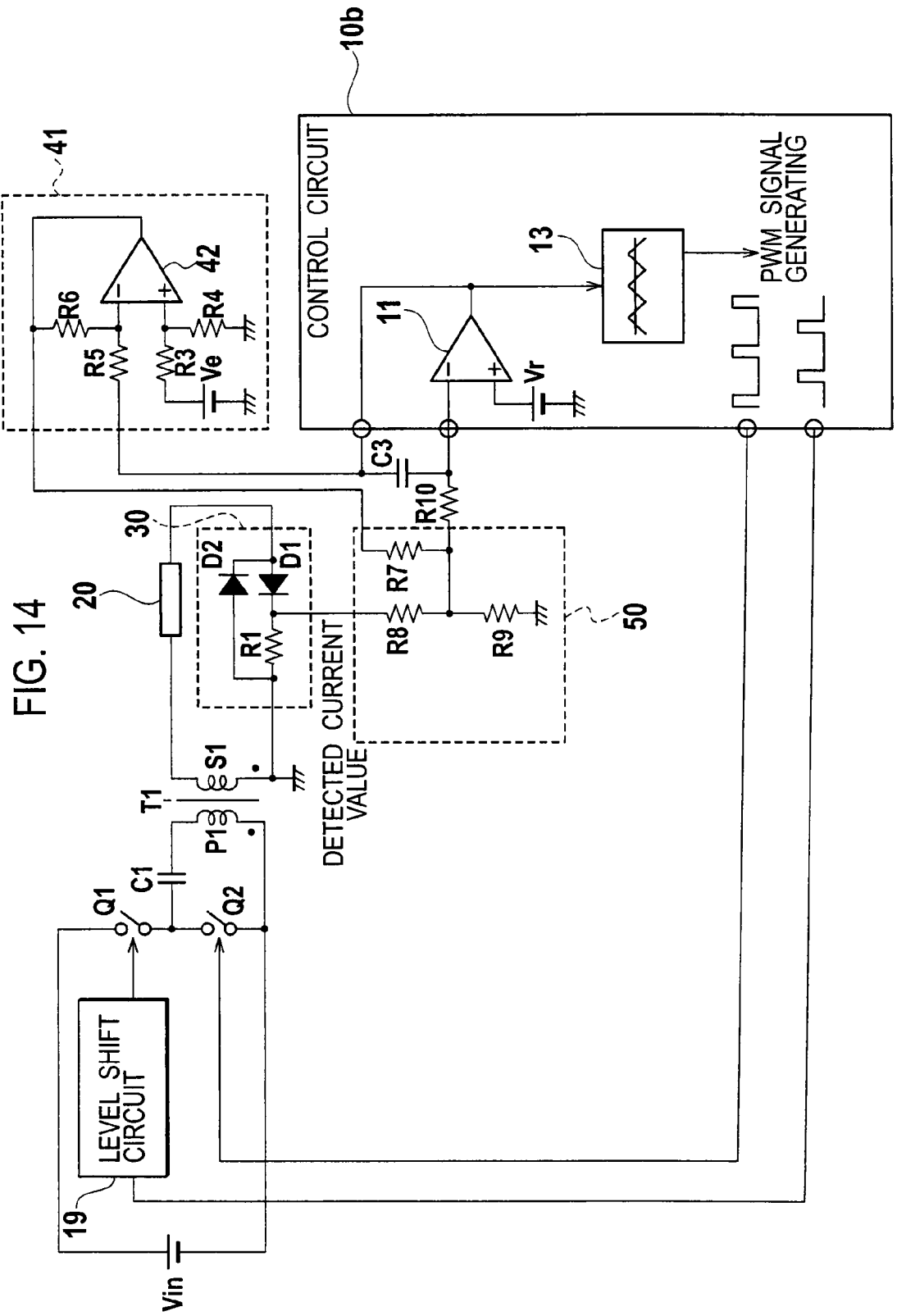
FIG. 14 is a detailed circuit diagram of Embodiment 5 of the alternating current power supply device of the present invention.

FIG. 14 is a detailed circuit diagram of Embodiment 5 of the alternating current power supply device of the present invention. In inverter 41 shown in FIG. 14, the resistance R4 is connected between the non-inversion terminal of the inverting part 42 and the ground, and the series circuit of the resistance R3 and the reference voltage Ve is connected between the non-inversion terminal of the inverting part 42 and the ground. The inversion terminal of the inverting part 42 is connected to one end of the capacitor C3 and the output terminal of the error amplifier 11 through the resistance R5. The other end of capacitor C3 is connected to the inversion terminal of the error amplifier 11. The resistance R6 is connected between the inversion terminal and the output terminal of the inverting part 42. In the inverter 41, partial voltage obtained by dividing the reference voltage Ve by the resistance R3 and the resistance R4 is applied to the non-inversion terminal of the inverting part 42, and the output voltage from the error amplifier 11 is applied to the inversion terminal through the resistance R5. Thus, the inverter 41 inverses the output voltage, and outputs it.

The addition circuit 50 comprises a resistance R9 connected to the output terminal of the inverting part 42, a resistance R8 connected to the output terminal of the current detecting circuit 30 (connection point between the resistance R1 and the diode D1) and a resistance R9 connected between a connection point between the resistances R7, R8 and the ground. The addition circuit 50 adds the mean value voltage from the inverter 41 through the resistance R7 to the voltage based on the detected current value from the current detecting circuit 30 through the resistance R8, and outputs the resulting voltage to the inversion terminal of the error amplifier 11 through the resistance R10.

Figure 15:
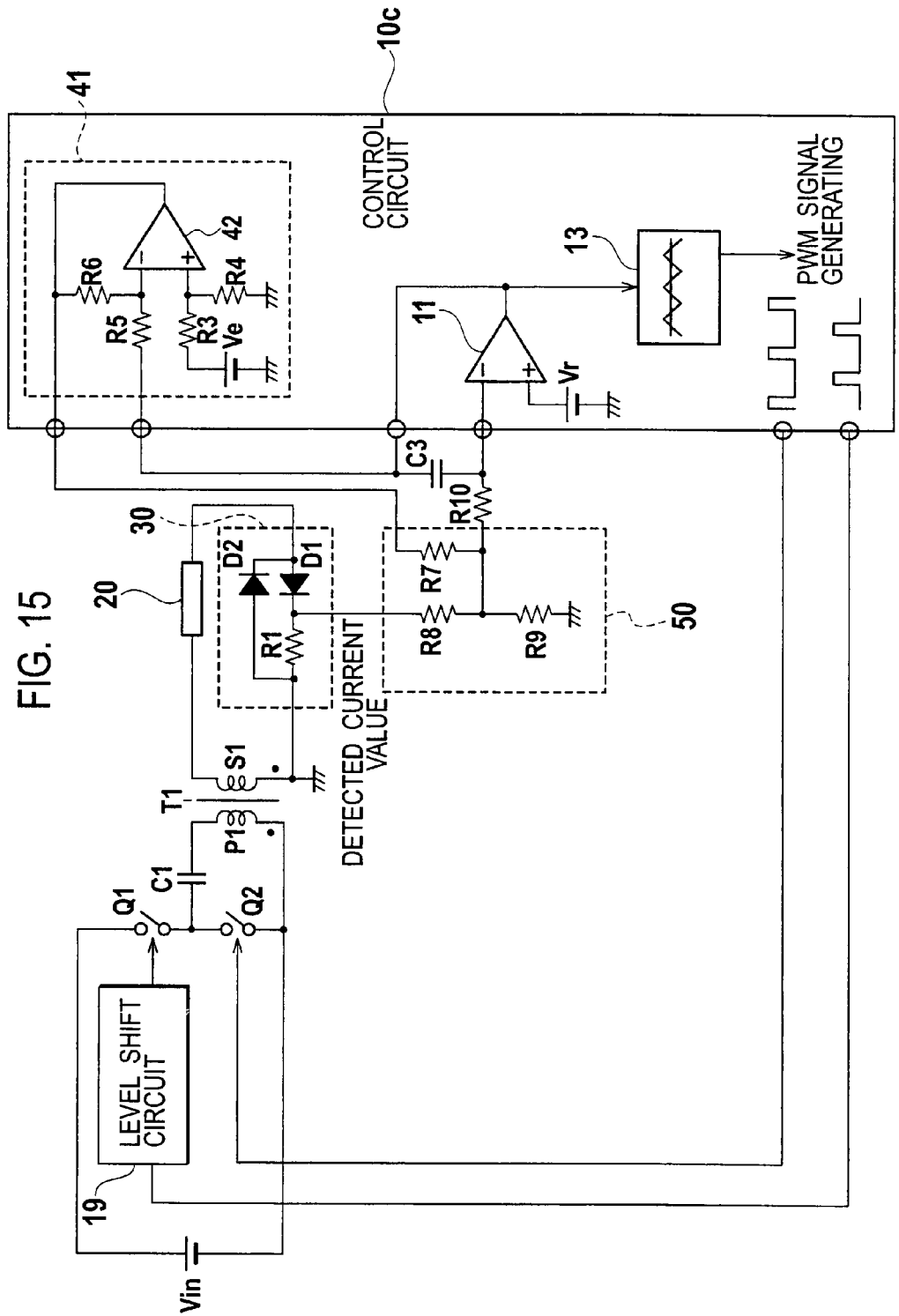
FIG. 15 is a view showing an integration example of the detailed circuit of Embodiment 5 of FIG. 14.

FIG. 15 is a view showing an integration example of the detailed circuit of Embodiment 5 of FIG. 14. The example shown in FIG. 15 is characterized in that the control circuit 10c having the error amplifier 11, the comparator circuit 13 and the inverter 41 is arranged on an identical semiconductor substrate thereby to be an integrated circuit.

By constructing these elements on the integrated circuit, it is possible to save the manufacturing cost of the device.

Embodiment 6

Figure 16:
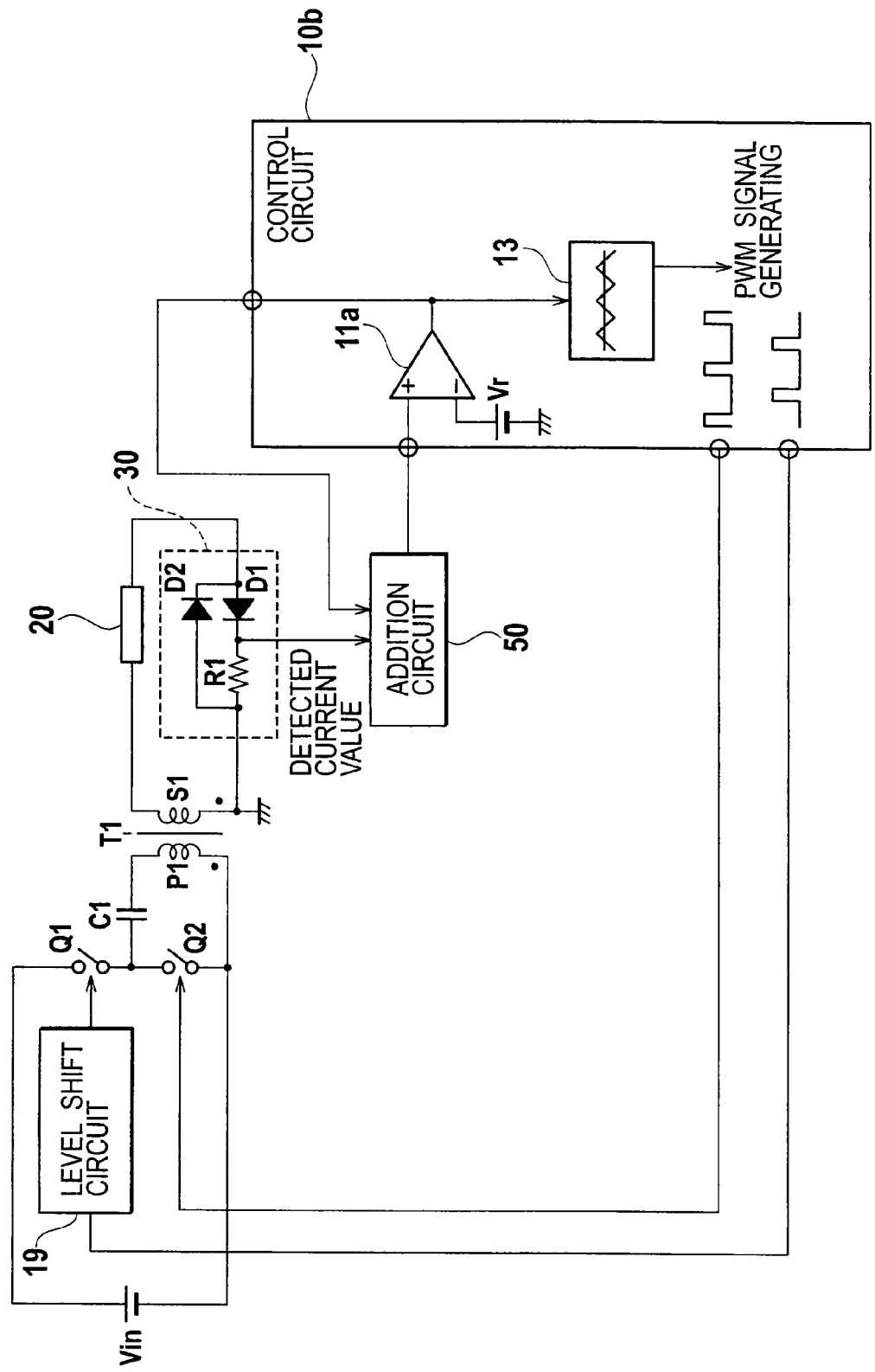
FIG. 16 is a circuit diagram of Embodiment 6 of the alternating current power supply device of the present invention.

FIG. 16 is a circuit diagram of Embodiment 6 of the alternating current power supply device of the present invention. The alternating current power supply device of FIG. 16 is characterized in eliminating the inverter 41 from the alternating current power supply device of FIG. 13. As the other constitutions are identical to those of FIG. 13, the same elements are indicated with the same reference numerals, respectively.

An error amplifier 11a (the second detecting circuit) amplifies an error voltage between the reference voltage Vr at the inversion terminal voltage and the voltage from the addition circuit 50 at the non-inversion terminal, and outputs an error voltage signal to the addition circuit 50. That is, the error voltage signal of the error amplifier 11a of FIG. 16 is identical to the inversion signal obtained by inverting the error voltage signal of the error amplifier 11 of FIG. 13 by the inverter 41. In this way, this inversion signal is outputted to the addition circuit 50.

The addition circuit 50 adds the correction signal as being the error voltage signal (inversion signal) from the error amplifier 11a to the detected current value by the current detecting circuit 30, and outputs the resulting value to the error amplifier 11a.

Therefore, according to the alternating current power supply device of Embodiment 6, effect similar to the effect of the alternating current power supply device of Embodiment 5 is obtained. Moreover, as the second detecting circuit can be formed by the error amplification circuit 11a, it is possible to eliminate the inverter 41 from the device, saving the manufacturing cost of the device.

The present invention is not limited to the above-mentioned alternating current power supply devices of Embodiments 1 to 6 only. For this alternating current power supply device, there may be provided an integrated circuit where the control circuit 10, 10a, 10b or 10c of any of the alternating current power supply devices of Embodiments 1 to 6, the addition circuit 50 and at least one of the correction signal generation circuits 40, 40a, 40b, and 45 are arranged on an identical semiconductor substrate.

In this case, as it has only to process the signals at the same voltage level, it is possible to integrate these elements in an integrated circuit easily. With the arrangement where the control circuit 10, 10a, 10b or 10c, the addition circuit 50 and the correction signal generation circuit 40, 40a, 40b or 45 are arranged on the same identical semiconductor substrate, as there is no need of increasing the number of input/output pins or such an integration is quit for a minimum number of input/output pins, it is possible to save the cost in forming these elements on the integrated circuit.

INDUSTRIAL APPLICABILITY

According to the present invention, the second detecting circuit detects the second electric signal representing the voltage of the direct current power supply, and the feedback circuit generates the feedback signal based on the first electric signal detected by the first detecting circuit and the second electric signal detected by the second detecting circuit, while the control signal is generated by the control circuit, based on the feedback signal from the feedback circuit. That is, by inputting the change of the input voltage to the control circuit, even if the loop gain of the feedback circuit is reduced, it is possible to prevent the output current from being varied by the change of the input voltage. As a result, the unstable control (oscillation, hunting, overshoot, etc.) due to the increasing of a loop gain is eliminated to stabilize the control operation.

In addition, according to the present invention, as the input voltage is detected from either the voltage of the direct current power supply or the terminal voltage of the switch element, the detecting circuit is simplified in structure.

In addition, according to the present invention, as the processing at the same voltage level as the control system can be realized by detecting the voltage corresponding to the input voltage upon averaging the duty of the control signal of the control circuit, the manufacturing of the control circuit including the feedback circuit can be facilitated.

In addition, according to the present invention, as the inversion signal from the control circuit has a phase difference of 180° from the signal for low side and is identical to a signal obtained by inverting the signal for low side, it is possible to output the inversion signal to the second detecting circuit as it is. Thus, it eliminates the need for the inverter, so that the constitution of the second detecting circuit can be simplified.

In addition, according to the present invention, as the correction signal can be formed by an inversion signal generated by inverting the error voltage signal from the error amplification circuit, the second detecting circuit can be simplified in structure.

In addition, according to the present invention, as the second detecting circuit can be composed of the error amplification circuit in the control circuit, the manufacturing cost of the device can be saved.

In addition, according to the present invention, with the arrangement where the control circuit, the feedback circuit and the second detecting circuit are arranged on an identical semiconductor substrate, it is possible to integrate these integrated circuits easily. Then, as there is no need of increasing the number of input/output pins or such an integration is quit for a minimum number of input/output pins, it is possible to save the cost in forming these elements on the integrated circuit.

The invention claimed is:

1. An alternating current power supply device comprising:
    a direct current power supply;
    a switch element for converting direct current power from the direct current power supply into alternating current power;
    a transformer for converting voltage of the alternating current power converted by the switch element into other voltage;
    a load connected to an output terminal of the transformer;
    a first detecting circuit for detecting a first electric signal indicating power to be supplied to the load;
    a second detecting circuit for detecting a second electric signal indicating the voltage of the direct current power supply;
    a feedback circuit for generating a feedback signal based on the first electric signal detected by the first detecting circuit and the second electric signal detected by the second detecting circuit; and
    a control circuit for generating a control signal based on the feedback signal from the feedback circuit and controlling on/off of the switch element by the control signal so that power to be supplied to the load is at a prescribed value,
    wherein the second detecting circuit is configured to detect, as the second electric signal, a control signal outputted from the control circuit to control on/off the switch element.

2. The alternating current power supply device of claim 1, wherein
    the second detecting circuit comprises a mean value signal generation circuit that processes, as the second electric signal, a mean value signal generated by averaging the control signal of the control circuit.

3. The alternating current power supply device of claim 1, wherein
    the second detecting circuit includes an inverter for inverting the control signal of the control circuit and a mean value signal generation circuit that processes, as the second electric signal, a mean value signal generated by averaging the control signal inversed by the inverter.

4. The alternating current power supply device of claim 1, wherein
    the second detecting circuit includes a mean value signal generation circuit that generates a mean value signal generated by averaging the control signal of the control circuit and an inverter that processes, as the second electric signal, an inverse signal obtained by inversing the mean value signal generated by the mean value signal generation circuit.

5. The alternating current power supply device of claim 2, wherein
    the switch element comprises a first switch element for low side and a second switch element for high side, both of which are connected to both ends of the direct current power supply and also connected with each other in series, the second switch element having a different character from the first switch element,
    the control circuit outputs a signal for low side as the control signal to the first switch element, and outputs a inversion signal having a phase difference of 180° from the signal for low side and obtained by inverting the signal for low side to the second switch element, and
    the control circuit outputs the inversion signal to the mean value signal generation circuit.

6. The alternating current power supply device of claim 1, wherein
    the control circuit includes an error amplifying circuit which amplifies a difference between the feedback signal from the feedback circuit and a reference voltage signal thereby to generate an error voltage signal, and
    the second detecting circuit comprises an inversion signal generation circuit that processes an inversion signal generated by inverting the error voltage signal from the error amplifying circuit, as the second electric signal.

7. The alternating current power supply device of claim 1, wherein
    the control circuit includes an error amplifying circuit which amplifies a difference between the feedback signal from the feedback circuit and a reference voltage signal thereby to generate an error voltage signal, and
    the second detecting circuit comprises the error amplifying circuit, and
    the second electric signal is identical to the error voltage signal from the error amplifying circuit.

8. An integrated circuit for an alternating current power supply device, wherein
    the control circuit of the alternating current power supply device of claim 1 and at least one of the feedback circuit and the second detecting circuit are arranged on an identical semiconductor substrate.

* * * * *